United States Patent [19]
Hsu et al.

[11] Patent Number: 5,405,927
[45] Date of Patent: Apr. 11, 1995

[54] ISOPRENE-BUTADIENE RUBBER

[75] Inventors: Wen-Liang Hsu, Copley; Barry A. Matrana, Akron; Adel F. Halasa, Bath; Michael B. Rodgers, Akron; Jennifer L. Gabor, Cuyahoga Falls, all of Ohio

[73] Assignee: The Goodyear Tire & Rubber Company, Akron, Ohio

[21] Appl. No.: 124,785

[22] Filed: Sep. 22, 1993

[51] Int. Cl.⁶ .................. C08F 236/08; B60C 5/00
[52] U.S. Cl. ..................... 526/337; 526/335; 525/237; 525/332.8; 152/209 R; 152/450
[58] Field of Search ............... 525/237, 332.8; 526/337; 152/209 R, 450

[56] References Cited

U.S. PATENT DOCUMENTS

| | | | |
|---|---|---|---|
| 4,843,120 | 6/1989 | Halasa et al. | 525/53 |
| 5,047,483 | 9/1991 | Halasa et al. | 525/237 |
| 5,104,941 | 4/1992 | Wolpers et al. | 525/237 |
| 5,137,998 | 8/1992 | Hsu et al. | 526/174 |
| 5,239,023 | 8/1993 | Hsu et al. | 526/340.2 X |
| 5,272,220 | 12/1993 | Rodgers et al. | |

*Primary Examiner*—Fred Teskin
*Attorney, Agent, or Firm*—Alvin T. Rockhill

[57] ABSTRACT

The subject invention discloses an isoprenebutadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., and wherein the rubber has a Mooney viscosity which is within the range of about 55 to about 140. The isoprene-butadiene rubber of this invention will preferably have a Mooney viscosity which is within the range of about 85 to about 130 and will more preferably have a Mooney viscosity which is within the range of about 115 to about 125.

19 Claims, No Drawings

ISOPRENE-BUTADIENE RUBBER

BACKGROUND OF THE INVENTION

Fuel expenses are one of the major costs encountered by the trucking industry. In recent years, many modifications have been implemented which make trucks more energy efficient. For instance, better fuel efficiency is being attained by implementing more aerodynamic designs which offer a lower coefficient of drag. Improved fuel efficiency can also be attained by designing tires which display less rolling resistance which also improves fuel economy.

In order to reduce the rolling resistance of a tire, rubbers having a high rebound can be utilized in making the tire's treads. Tires made with such rubbers undergo less energy loss during rolling. The traditional problem associated with this approach is that the tire's wet traction and wet skid resistance characteristics are compromised. This is because good rolling resistance which favors low energy loss and good traction characteristics which favor high energy loss are viscoelastically inconsistent properties.

In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads. However, such blends are not totally satisfactory for all purposes.

U.S. Pat. No. 4,843,120 discloses that tires having improved performance characteristics can be prepared by utilizing rubbery polymers having multiple glass transition temperatures as the tread rubber. These rubbery polymers having multiple glass transition temperatures exhibit a first glass transition temperature which is within the range of about −110° C. to −20° C. and exhibit a second glass transition temperature which is within the range of about −50° C. to 0° C. According to U.S. Pat. No. 4,843,120, these polymers are made by polymerizing at least one conjugated diolefin monomer in a first reaction zone at a temperature and under conditions sufficient to produce a first polymeric segment having a glass transition temperature which is between −110° C. and −20° C. and subsequently continuing said polymerization in a second reaction zone at a temperature and under conditions sufficient to produce a second polymeric segment having a glass transition temperature which is between −20° C. and 20° C. Such polymerizations are normally catalyzed with an organolithium catalyst and are normally carried out in an inert organic solvent.

U.S. Pat. No. 5,137,998 discloses a process for preparing a rubbery terpolymer of styrene, isoprene, and butadiene having multiple glass transition temperatures and having an excellent combination of properties for use in making tire treads which comprises: terpolymerizing styrene, isoprene and 1,3-butadiene in an organic solvent at a temperature of no more than about 40° C. in the presence of (a) at least one member selected from the group consisting of tripiperidino phosphine oxide and alkali metal alkoxides and (b) an organolithium compound.

U.S. Pat. No. 5,047,483 discloses a pneumatic tire having an outer circumferential tread where said tread is a sulfur cured rubber composition comprised of, based on 100 parts by weight rubber (phr), (A) about 10 to about 90 parts by weight of a styrene, isoprene, butadiene terpolymer rubber (SIBR), and (B) about 70 to about 30 weight percent of at least one of cis 1,4-polyisoprene rubber and cis 1,4-polybutadiene rubber wherein said SIBR rubber is comprised of (1) about 10 to about 35 weight percent bound styrene, (2) about 30 to about 50 weight percent bound isoprene and (3) about 30 to about 40 weight percent bound butadiene and is characterized by having a single glass transition temperature (Tg) which is in the range of about −10° C. to about −40° C. and, further the said bound butadiene structure contains about 30 to about 40 percent 1,2-vinyl units, the said bound isoprene structure contains about 10 to about 30 percent 3,4-units, and the sum of the percent 1,2-vinyl units of the bound butadiene and the percent 3,4-units of the bound isoprene is in the range of about 40 to about 70 percent.

U.S. patent application Ser. No. 07/944,669 now U.S. Pat. No. 5,272,220 discloses a styrene-isoprene-butadiene rubber which is particularly valuable for use in making truck tire treads which exhibit improved rolling resistance and tread wear characteristics, said rubber being comprised of repeat units which are derived from about 5 weight percent to about 20 weight percent styrene, from about 7 weight percent to about 35 weight percent isoprene, and from about 55 weight percent to about 88 weight percent 1,3-butadiene, wherein the repeat units derived from styrene, isoprene and 1,3-butadiene are in essentially random order, wherein from about 25% to about 40% of the repeat units derived from the 1,3-butadiene are of the cis-microstructure, wherein from about 40% to about 60% of the repeat units derived from the 1,3-butadiene are of the trans-microstructure, wherein from about 5% to about 25% of the repeat units derived from the 1,3-butadiene are of the vinyl-microstructure, wherein from about 75% to about 90% of the repeat units derived from the isoprene are of the 1,4-microstructure, wherein from about 10% to about 25% of the repeat units derived from the isoprene are of the 3,4-microstructure, wherein the rubber has a glass transition temperature which is within the range of about −90° C. to about −70° C., wherein the rubber has a number average molecular weight which is within the range of about 150,000 to about 400,000, wherein the rubber has a weight average molecular weight of about 300,000 to about 800,000, and wherein the rubber has an inhomogeneity which is within the range of about 0.5 to about 1.5.

SUMMARY OF THE INVENTION

It has been unexpectedly found that the rolling resistance and tread wear characteristics of truck tires can be significantly improved by incorporating the isoprene-butadiene rubber (IBR) of this invention into the treads thereof. More importantly, this improvement in rolling resistance and tread wear characteristics can be achieved without sacrificing wet traction and wet skid resistance. Truck tires made utilizing this specific IBR in the treads thereof also display a resistance to stone cutting which is an least as good as that observed in conventional truck tires.

The subject invention more specifically discloses an isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about $-90°$ C. to about $-75°$ C., and wherein the rubber has a Mooney viscosity which is within the range of about 55 to about 140.

The subject invention further discloses a pneumatic truck tire having an outer circumferential tread wherein said tread is a sulfur cured rubber composition comprised of, based on 100 parts by weight of rubber, (a) from about 25 to about 75 parts of an isoprene-butadiene rubber, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about $-90°$ C. to about $-75°$ C., and wherein the rubber has a Mooney viscosity which is within the range of about 55 to about 140; and (b) from about 25 to about 75 parts of natural rubber.

The subject invention also reveals a pneumatic truck tire having an outer circumferential tread wherein said tread is a sulfur cured rubber composition comprised of, based on 100 parts by weight of rubber, (a) from about 80 to about 95 parts of an isoprene-butadiene rubber, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about $-90°$ C. to about $-75°$ C., and wherein the rubber has a Mooney viscosity which is within the range of about 55 to about 140; and (b) from about 5 to about 20 parts of 3,4-polyisoprene rubber.

The IBR of this invention is prepared by solution polymerizations utilizing an organolithium initiator. The process used in synthesizing this IBR is conducted as a continuous process which is carried out at a temperature which is within the range of about 70° C. to about 140° C. It has been unexpectedly found that gel build-up can be inhibited by conducting such polymerizations in the presence of a trace amount of a polar modifier, such as N,N,N',N'-tetramethylethylenediamine (TMEDA).

DETAILED DESCRIPTION OF THE INVENTION

The IBR of this invention is synthesized by solution polymerization. Such solution polymerizations will normally be carried out in a hydrocarbon solvent which can be one or more aromatic, paraffinic, or cycloparaffinic compounds. These solvents will normally contain from 4 to 10 carbon atoms per molecule and will be liquids under the conditions of the polymerization. Some representative examples of suitable organic solvents include pentane, isooctane, cyclohexane, normal hexane, benzene, toluene, xylene, ethylbenzene, and the like, alone or in admixture.

In the solution polymerizations of this invention, there will normally be from about 5 to about 35 weight percent monomers in the polymerization medium. Such polymerization media are, of course, comprised of the organic solvent, 1,3-butadiene monomer and isoprene monomer. In most cases, it will be preferred for the polymerization medium to contain from 10 to 30 weight percent monomers. It is generally more preferred for the polymerization medium to contain 20 to 25 weight percent monomer.

The monomer charge compositions utilized in the polymerizations of this invention will typically contain from about 20 weight percent to about 50 weight percent isoprene and from about 50 weight percent to about 80 weight percent 1,3-butadiene monomer. It is typically preferred for the monomer charge composition to contain from about 25 weight percent to about 35 weight percent isoprene and from about 65 weight percent to about 85 weight percent 1,3-butadiene.

The IBR of this invention is synthesized on a continuous basis. In this continuous process, the monomers and an organolithium initiator are continuously fed into a reaction vessel or series of reaction vessels. The pressure in the reaction vessel is typically sufficient to maintain a substantially liquid phase under the conditions of the polymerization reaction. The reaction medium will generally be maintained at a temperature which is within the range of about 70° C. to about 140° C. throughout the copolymerization. This is generally preferred for the copolymerization to be conducted in a series of reaction vessels and for the reaction temperature to be increased from reaction vessel to reaction vessel as the polymerization proceeds. For instance, it is desirable to utilize a two reactor system wherein the temperature in the first reactor is maintained within the range of about 70° C. to 90° C. and wherein the temperature in the second reactor is maintained within the range of about 90° C. to about 100° C.

The organolithium compounds which can be utilized as initiators in the terpolymerizations of this invention include organomonolithium compounds and organomonofunctional lithium compounds. The organo multifunctional lithium compounds will typically be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The organolithium compounds which can be utilized are normally organomonolithium compounds. The organolithium compounds which are preferred can be represented by the formula: R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The amount of organolithium initiator employed will be dependent upon the molecular weight which is desired for the IBR being synthesized. An amount of organolithium initiator will be selected to result in the production of IBR having a Mooney viscosity which is within the range of 55 to 140. The amount of organolithium initiator will preferably be selected to result in the production of IBR having a Mooney viscosity which is within the range of 85 to 130. The amount of organolithium initiator will more preferably be selected to result in the production of a IBR having a Mooney viscosity which is within the range of about 115 to 125.

As a general rule in all anionic polymerizations, the molecular weight (Mooney viscosity) of the polymer produced is inversely proportional to the amount of catalyst utilized. As a general rule, from about 0.01 to about 1 phm (parts per hundred parts of monomer by weight) of the organolithium compound will be employed. In most cases, it will be preferred to utilize from about 0.015 to about 0.1 phm of the organolithium compound with it being most preferred to utilize from about 0.025 phm to 0.07 phm of the organolithium compound.

To inhibit gelation, it is important to carry out such polymerizations in the presence of a trace amount of a polar modifier, such as N,N,N',N'-tetramethylethylenediamine (TMEDA). For this reason, it is highly desirable to continuously feed a polar modifier into the reaction vessel utilized. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like. Dipiperidinoethane, dipyrrolidinoethane, tetramethylethylene diamine, diethylene glycol, dimethyl ether, TMEDA and tetrahydrofuran are representative of highly preferred modifiers. U.S. Pat. No. 4,022,959 describes the use of ethers and tertiary amines as polar modifiers in greater detail.

Optionally, 1,2-butadiene can also be continuously fed into the reaction zone. The 1,2-butadiene will typically be present in the polymerization medium at a concentration which is within the range of 10 to about 500 ppm (parts per million parts). It is generally preferred for the 1,2-butadiene to be present at a level which is within the range of about 50 ppm to about 300 ppm. It is generally more preferred for the 1,2-butadiene to be present at a level which is within the range of about 100 ppm to about 200 ppm.

The polar modifier will typically be present at a molar ratio of the polar modifier to the organolithium compound which is within the range of about 0.01:1 to about 0.2:1. A molar ratio of polar modifier to the organolithium initiator of greater than about 0.2:1 should not be exceeded because the polar modifier acts to increase the glass transition temperature of the IBR produced.

To keep the glass transition temperature of the IBR within the desired range of about −90° C. to about −75° C., the amount of polar modifier employed should be the minimum amount required to inhibit gelation. A molar ratio of polar modifier to the organolithium compound of greater than about 0.2:1 will typically not be exceeded because such high ratios of polar modifier to the organolithium compound can result in the IBR produced having a glass transition temperature of greater than −70° C. As a general rule, a molar ratio of polar modifier to the organolithium compound which is within the range of about 0.05:1 to about 0.15:1 will be employed. It is typically more preferred for the molar ratio of polar modifier to the organolithium compound to be within the range of about 0.08:1 to about 0.12:1.

After a monomer conversion of about 70% to about 10% is achieved, the living intermediate polymer can optionally be partially coupled with divinyl benzene, tin tetrachloride or silicon tetrachloride. This is typically done in a second reaction vessel. For instance, the living intermediate polymer can be pumped from a first reaction vessel to a second reaction vessel where the coupling agent is added to the polymerization medium. The coupling agent is preferably added after a monomer conversion of 72% to 90% has been attained and is more preferably added after a monomer conversion of 75% to 85% has been attained.

The coupling agent is added at a level which is sufficient to jump the molecular weight of the polymer to the desired degree without killing all of the living intermediate polymer chains. In the absence of coupling agents, all of the polymer chains can grow to completion (but no molecular weight jumping can occur). At a molar ratio of organolithium initiator to coupling agent of 4 or greater, complete coupling is possible, but because the coupling is by termination, further polymerization and higher levels of conversion cannot be attained. The optimum level is, of course, between these two extremes. As a general rule, the molar ratio of organolithium compound to the coupling agent will be within the range of about 6:1 to about 20:1. Molar ratios of the organolithium compound to the coupling agent which are within the range of about 8:1 to about 12:1 are preferred because they induce sufficient coupling to achieve the desired increased in molecular weight while leaving an adequate number of living chains to attain acceptable conversion levels. Since there are fewer living chains after the coupling, those that are still living attain a higher molecular weight than would otherwise have been achieved had the coupling agent not been employed.

Since the living intermediate polymer is only partially coupled, living polymer chains still exist after the coupling step. Accordingly, in such a scenario the copolymerization is allowed to continue with the still living polymer chains increasing in molecular weight as the copolymerization continues. The copolymerization is then allowed to continue in this step until a conversion in excess of about 90 percent is attained. It is preferred for the conversion to be in excess of about 95 percent with essentially quantitative conversions of greater than about 99 percent preferably being reached.

The IBR produced is then recovered from the organic solvent. The IBR can be recovered from the organic solvent by standard techniques, such as decantation, filtration, centrification and the like. It is often desirable to precipitate the IBR from the organic solvent by the addition of lower alcohols containing from 1 to about 4 carbon atoms to the polymer solution. Suitable lower alcohols for precipitation of the IBR from the polymer cement include methanol, ethanol, isopropyl alcohol, n-propyl alcohol and t-butyl alcohol. The utilization of lower alcohols to precipitate the IBR from the polymer cement also "kills" the living IBR chains by inactivating lithium end groups. After the IBR is recovered from the organic solvent, steam stripping can be employed to reduce the level of volatile organic compounds in the rubber.

The IBR made by the process of this invention is characterized by being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about $-90°$ C. to about $-75°$ C., and wherein the rubber has a Mooney viscosity which is within the range of about 55 to about 140. The isoprene-butadiene rubber will preferably have a Mooney ML-4 viscosity which is within the range of about 85 to about 130.

The repeat units in the IBR will preferably be derived from about 30 weight percent to about 40 weight percent isoprene and from about 60 weight percent to about 70 weight percent 1,3-butadiene, wherein the repeat units derived from isoprene and 1,3-butadiene are in essentially random order, wherein from about 5% to about 8% of the repeat units in said rubber are 1,2-polybutadiene units, wherein from about 55% to about 65% of the repeat units in said rubber are 1,4-polybutadiene units, wherein from about 1% to about 3% of the repeat units in said rubber are 3,4-polyisoprene units, wherein from about 28% to about 36% of the repeat units in the polymer are 1,4-polyisoprene units, wherein the rubber has a glass transition temperature which is within the range of about $-85°$ C. to about $-80°$ C., and wherein the rubber has a Mooney viscosity which is within the range of about 115 to about 125.

The repeat units which are derived from isoprene or 1,3-butadiene differ from the monomer from which they were derived in that a double bond was consumed by the polymerization reaction.

The repeat units derived from isoprene and 1,3-butadiene are in the IBR in an essentially random order. The term "random" as used herein means that the repeat units which are derived from isoprene are well dispersed throughout the polymer and are mixed in with repeat units which are derived from 1,3-butadiene. For purposes of this patent "random" means that over 60% of the isoprene in the IBR is present in blocks of three or less repeat units.

For purposes of this patent application, polymer microstructures are determined by nuclear magnetic resonance spectrometry (NMR). Glass transition temperatures are determined by differential scanning calorimetry at a heating rate of 10° C. per minute and molecular weights are determined by gel permeation chromatography (GPC).

The IBR of this invention is particularly valuable for use in making truck tires which display less rolling resistance and are, accordingly, more energy efficient. The IBR is blended with natural rubbers or 3,4-polyisoprene making tread compounds. One such tread compound is comprised of, based on 100 parts by weight of rubber, (a) from about 25 parts to about 75 parts of the IBR and (b) from about 25 parts to about 75 parts of natural rubber. It is preferred for this tread compound to contain from about 45 parts to about 55 parts of the IBR and from about 45 parts to about 55 parts of natural rubber.

Another highly preferred blend for utilization in making truck tires is comprised of, based on 100 parts by weight of rubber, (a) 80 parts to 95 parts of the IBR and (b) from about 5 parts to about 20 parts of 3,4-polyisoprene. It is preferred for this rubber blend to contain from about 85 parts to about 90 parts of the IBR, from about 10 parts to about 15 parts of the 3,4-polyisoprene.

The 3,4-polyisoprene which can be utilized will have a 3,4-microstructure content of 55% to 80% as determined by NMR spectroscopy. The 3,4-polyisoprene will, accordingly, have a cis-1,4-microstructure content which is within the range of 20% to 45%. The 3,4-polyisoprene will also have a glass transition temperature from $-25°$ C. to 10° C. as determined by differential scanning calorimetry at a heating rate of 10° C./minute. The 3,4-polyisoprene will further have a number average molecular weight (Mn) of at least 220,000 as determined by gel permeation chromatography and an inhomogeneity ($\mu$) of less than 1.8. The inhomogeneity is defined by the equation: $U = Mw/Mn_{-1}$, where Mw is the weight average molecular weight of the 3,4-polyisoprene as determined by gel permeation chromatography.

The 3,4-polyisoprene can be synthesized by the technique disclosed in U.S. Pat. No. 5 1,239,023. This technique for producing 3,4-polyisoprene involves: (1) adding a catalyst system which is comprised of (a) an organoiron compound which is soluble in the organic solvent, wherein the iron in the organoiron compound is in the $+3$ oxidation state, (b) a partially hydrolyzed organoaluminum compound, which was prepared by adding a protonic compound selected from the group consisting of water, alcohols and carboxylic acids to the organoaluminum compound, and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1 to a polymerization medium containing isoprene monomer and an organic solvent, and (2) allowing the isoprene monomer to polymerize at a temperature which is within the range of about −10° C. to about 100° C.

A representative example of a 3,4-polyisoprene rubber which can be employed in the truck tire tread Of this invention is sold by Huels AG under the tradename Vestogrip® A6001.

These IBR containing blends can be compounded utilizing conventional ingredients and standard techniques. For instance, the IBR containing blends will typically be blended with carbon black, sulfur, fillers, accelerators, oils, waxes, scorch inhibiting agents, and processing aids. In most cases, the IBR containing rubber blends will be compounded with sulfur and/or a sulfur containing compound, at least one filler, at least one accelerator, at least one antidegradant, at least one processing oil, zinc oxide, optionally a tackifier resin, opnionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 5 phr of at least one filler will be utilized in the blend with 30 to 80 phr being preferred. In most cases at least some carbon black will be utilized in the filler. The filler can, of course, be comprised totally of carbon black. Silica can be included in the filler to improve tear resistance and heat build up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The IBR containing blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers, and 0 to 1 phr of scorch inhibiting agents.

The IBR containing rubber blends of this invention can be used in tire treads in conjunction with ordinary tire manufacturing techniques. Tires are built utilizing standard procedures with the IBR simply being substituted for the rubber compounds typically used as the tread rubber. After the tire has been built with the IBR containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 14 minutes with a cure cycle of about 12 minutes being most preferred.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

The IBR prepared in this experiment was synthesized in a two-reactor (10 liters each) continuous system at 95° C. A premix containing isoprene and 1,3-butadiene in hexane was charged into the first polymerization reactor continuously at a rate of 100 grams/minute. The premix monomer solution containing a ratio of isoprene to 1,3-butadiene of 30:70 and had a total monomer concentration of 11%. Polymerization was initiated by adding a 0.107M solution of n-butyllithium into the first reactor at a rate of 0.32 grams/minute. The residence time for both reactors was set at 1.16 hours. The average monomer conversions were determined to be 62% for the first reactor and 93% for the second reactor.

The polymerization medium was continuously pushed over from the second reactor to a holding tank which contained methanol (as a shortstop) and an antioxidant. The resulting polymer cement was then steam stripped and the IBR recovered was dried in a vacuum over at a temperature of 60° C. The isoprene distribution in the IBR was random since the isoprene and butadiene monomers were continuously pumped into the reactors. The polymer was determined to have a glass transition temperature at −84° C. and have a Mooney ML-4 viscosity of 85. It was also determined to have a microstructure which contained 6% 1,2-polybutadiene units, 60% 1,4-polybutadiene units, 32% 1,4-polyisoprene units and 2% 3,4-polyisoprene units.

The recovered IBR rubber and a medium cis-1,4-polybutadiene commonly utilized in commercial truck tire tread formulations (as a control) were then compounded utilizing a truck tire tread formulation which included carbon black, sulfur, natural rubber and an accelerator. The natural rubber was included in the blend at a 1:1 ratio to the IBR or the control medium cis-1,4-polybutadiene. Their compound physical properties and tire performance properties are listed in Tables I and II, respectively.

TABLE I

| Compound Physical Properties | | |
|---|---|---|
| Compound | PBD Blend | IBR Blend |
| Tensile Strength (MPa) | 19.71 | 16.19 |
| Elongation (%) | 435 | 340 |
| Rebound (%) @ 0° C. | 40 | 41 |
| Rebound @ 100° C. | 65 | 59 |
| Rheology Properties | | |
| Tan Delta @ 0° C. | 0.125 | 0.114 |
| Tan Delta @ 60° C. | 0.098 | 0.076 |

TABLE II

| Tire Performance Properties | | |
|---|---|---|
| Tire Compound (Table I) Measured Values | PBD Blend | IBR Blend |
| Evenness of Wear[1] | 100 | 105 |
| Rolling Resistance[2] (67" Wheel) | 100 | 100 |
| Wet Skid Resistance | 100 | 110 |
| Wet Traction | 100 | 115 |
| Tire Running Temperature[3] | 100 | 100 |
| Fast Treadwear[4] | 100 | 100 |
| Damage Resistance[5] | | |
| Global Treadwear[6] | 100 | 110 |

TABLE II-continued (1) Evenness (uniformity) of wear is the standard deviation of tread depth measurements expressed as a rating. An increase in the rating is an improvement.
(2) An increase in the rolling resistance value quoted is a measure of the reduction of rolling resistance of the tire and thus an improvement.
(3) Tire running temperature is the tread temperature measured while the tire is at 35 miles per hour (56 km/hour) with an infrared pyrometer. A higher rating is a lower temperature which is better.
(4) Fast wear performance is the rate of wear under severe conditions and simulates city spot and state conditions.
(5) Damage resistance is a measure of the resistance to chipping, chunking, and cutting after running for a defined distance and duration, typically 8000 miles (12,875 km) on a gravel road.
(6) Global treadwear is the remaining tire tread depth after a defined duration in highway service, typically 60,000 miles (96,560 km). An increase in the tread wear rating value is an improvement.

EXAMPLE 2

In this experiment, isoprene-butadiene copolymer (IBR) having a low vinyl content was synthesized using an unmodified n-butyllithium catalyst. In the procedure used, 10,900 grams of a silica/molecular sieve/alumina dried premix containing isoprene and 1,3-butadiene in hexane was charged into a five gallon (19 liters) reactor. The premix monomer solution contained a ratio of isoprene to 1,3-butadiene of 25:75 and the total monomer concentration was 19%. The monomer premix solution had been previously scavenged for impurities with a n-butyllithium solution. Polymerization was initiated by the addition of 4.18 ml of a 1.6M solution of n-butyllithium. The reactor was maintained at a temperature of about 65° C. until essentially complete monomer conversion had been achieved which took about three hours. The polymerization medium was then shortstopped with ethanol and the polymer was stabilized with 1 phr (parts per hundred parts of polymer) of an antioxidant. After evaporating hexane, the recovered polymer was dried in a vacuum oven at 50° C. The isoprene-butadiene copolymer produced was determined to have glass transition temperature (Tg) at −88° C. It was also determined to have a microstructure which contained 7% 1,2-polybutadiene units, 68% 1,4-polybutadiene units, 1% 3,4-polyisoprene units and 24% 1,4-polyisoprene units.

EXAMPLES 3–7

The procedure described in Example 1 was utilized in these examples except that the isoprene to butadiene ratios were changed from 25:75 to 35:65, 40:60, 50:50, 60:40 and 75:25. The Tg's and microstructures of the resulting isoprene-butadiene copolymers are listed in Table III.

TABLE III

| | Low Tg Isoprene-Butadiene Copolymers | | | | | |
|---|---|---|---|---|---|---|
| Example No. | Isop/Bd Ratios | Tg (°C.) | \multicolumn{4}{c}{Microstructure (%)} |
| | | | 1,2-PBd | 1,4-PBd | 3,4-PI | 1,4-PI |
| 2 | 25:75 | −88 | 7 | 68 | 1 | 24 |
| 3 | 36:65 | −86 | 6 | 59 | 3 | 32 |
| 4 | 40:60 | −84 | 6 | 54 | 3 | 37 |
| 5 | 50:50 | −81 | 5 | 46 | 3 | 46 |
| 6 | 60:40 | −77 | 4 | 37 | 4 | 55 |
| 7 | 75:25 | −72 | 4 | 24 | 4 | 68 |

While certain representative embodiments and details have been shown for the purpose of illustrating the subject invention, it will be apparent to those skilled in this art that various changes and modifications can be made therein without departing from the scope of the subject invention.

What is claimed is:

1. An isoprene-butadiene rubber which is particularly valuable for use in making truck tire treads, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., wherein the rubber has a Mooney viscosity which is within the range of about 55 to about 140, and wherein over 60% of the isoprene in the isoprene-butadiene rubber is present in blocks of three or less repeat units.

2. An isoprene-butadiene rubber as specified in claim 1 wherein the repeat units in the rubber are derived from about 30 weight percent to about 40 weight percent isoprene and from about 60 weight percent to about 70 weight percent 1,3-butadiene, wherein from about 5% to about 8% of the repeat units in said rubber are 1,2-polybutadiene units, wherein from about 55% to about 65% of the repeat units in said rubber are 1,4-polybutadiene units, wherein from about 1% to about 3% of the repeat units in said rubber are 3,4-polyisoprene units, and wherein from about 28% to about 36% of the repeat units in the polymer are 1,4-polyisoprene units.

3. An isoprene-butadiene rubber as specified in claim 2 wherein the rubber has a glass transition temperature which is within the range of about −85° C. to about −80° C.

4. An isoprene-butadiene rubber as specified in claim 3 wherein the rubber has a Mooney viscosity which is within the range of about 85 to about 130.

5. An isoprene-butadiene rubber as specified in claim 2 wherein the isoprene-butadiene rubber has a Mooney viscosity which is within the range of about 115 to 125.

6. A pneumatic truck tire having an outer circumferential tread wherein said tread is a sulfur cured rubber composition comprised of, based on 100 parts by weight of rubber, (a) from about 25 to about 75 parts of an isoprene-butadiene rubber, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., wherein the rubber has a Mooney viscosity which is within the range of about 55 to about 140, and wherein over 60% of the isoprene in the isoprene-butadiene rubber is present in blocks of three or less repeat units; and (b) from about 25 to about 75 parts of natural rubber.

7. A pneumatic tire as specified in claim 6 wherein the repeat units in the isoprene-butadiene rubber are derived from about 30 weight percent to about 40 weight percent isoprene and from about 60 weight percent to about 70 weight percent 1,3-butadiene, wherein from about 5% to about 8% of the repeat units in said rubber are 1,2-polybutadiene units, wherein from about 55% to about 65% of the repeat units in said rubber are 1,4-polybutadiene units, wherein from about 1% to about 3% of the repeat units in said rubber are 3,4-polyisoprene units, and wherein from about 28% to about 36% of the repeat units in the polymer are 1,4-polyisoprene units.

8. A pneumatic tire as specified in claim 7 wherein the isoprene-butadiene rubber has a Mooney viscosity which is within the range of about 85 to about 130.

9. A pneumatic truck tire as specified in claim 8 wherein the isoprene-butadiene rubber has a glass transition temperature which is within the range of about −85° C. to about −80° C. and wherein the isoprenebutadiene rubber has a Mooney viscosity which is within the range of about 115 to about 125.

10. A pneumatic truck tire as specified in claim 9 which is comprised of (a) from about 45 parts to about 55 parts of the isoprene-butadiene rubber and (b) from about 45 parts to about 55 parts of natural rubber.

11. A pneumatic truck tire having an outer circumferential tread wherein said tread is a sulfur cured rubber composition comprised of, based on 100 parts by weight of rubber, (a) from about 80 to about 95 parts of an isoprene-butadiene rubber, said rubber being comprised of repeat units which are derived from about 20 weight percent to about 50 weight percent isoprene and from about 50 weight percent to about 80 weight percent 1,3-butadiene, wherein the repeat units derived from isoprene and 1,3-butadiene are in essentially random order, wherein from about 3% to about 10% of the repeat units in said rubber are 1,2-polybutadiene units, wherein from about 50% to about 70% of the repeat units in said rubber are 1,4-polybutadiene units, wherein from about 1% to about 4% of the repeat units in said rubber are 3,4-polyisoprene units, wherein from about 25% to about 40% of the repeat units in the polymer are 1,4-polyisoprene units, wherein the rubber has a glass transition temperature which is within the range of about −90° C. to about −75° C., wherein the rubber has a Mooney viscosity which is within the range of about 55 to about 140, and wherein over 60% of the isoprene in the isoprene-butadiene rubber is present in blocks of three or less repeat units; and (b) from about 5 to about 20 parts of 3,4-polyisoprene rubber.

12. A pneumatic tire as specified in claim 11 wherein the repeat units in the isoprene-butadiene rubber are derived from about 30 weight percent to about 40 weight percent isoprene and from about 60 weight percent to about 70 weight percent 1,3-butadiene, wherein from about 5% to about 8% of the repeat units in said rubber are 1,2-polybutadiene units, wherein from about 55% to about 65% of the repeat units in said rubber are 1,4-polybutadiene units, wherein from about 1% to about 3% of the repeat units in said rubber are 3,4-polyisoprene units, and wherein from about 28% to about 36% of the repeat units in the polymer are 1,4-polyisoprene units.

13. A pneumatic truck tire as specified in claim 12 wherein the 3,4-polyisoprene rubber has a cis-1,4-microstructure content which is within the range of 20% to 45%.

14. A pneumatic tire as specified in claim 12 wherein the isoprene-butadiene rubber has a Mooney viscosity which is within the range of about 85 to about 130.

15. A pneumatic truck tire as specified in claim 14 wherein the isoprene-butadiene rubber has a glass transition temperature which is within the range of about −85° C. to about −80° C. and wherein the isoprene-butadiene rubber has a Mooney viscosity which is within the range of about 115 to 125.

16. A pneumatic truck tire as specified in claim 15 which is comprised of (a) from about 85 parts to about 90 parts of the isoprene-butadiene rubber and (b) from about 10 parts to about 15 parts of 3,4-polyisoprene rubber.

17. A pneumatic truck tire as specified in claim 16 wherein the 3,4-polyisoprene rubber has a 3,4-microstructure content which is within the range of about 55% to about 80%.

18. A pneumatic truck tire as specified in claim 17 wherein the 3,4-polyisoprene has a glass transition temperature of −25° C. to 10° C. as determined by differential scanning calorimetry.

19. A pneumatic truck tire as specified in claim 18 wherein the 3,4-polyisoprene has a number average molecular weight of at least 220,000 and an inhomogeneity of less than 1.8 as determined by gel permeation chromatography.

* * * * *